(12) United States Patent
Gatepin

(10) Patent No.: US 7,672,371 B2
(45) Date of Patent: Mar. 2, 2010

(54) BIT RATE ALLOCATION IN JOINT BIT RATE TRANSCODING

(75) Inventor: Philippe Gatepin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1679 days.

(21) Appl. No.: 09/836,096

(22) Filed: Apr. 17, 2001

(65) Prior Publication Data
US 2001/0038668 A1    Nov. 8, 2001

(30) Foreign Application Priority Data
Apr. 18, 2000    (EP) .................................. 00401077

(51) Int. Cl.
H04N 7/12     (2006.01)
H04N 11/02    (2006.01)
(52) U.S. Cl. ............................... 375/240.12; 375/240.26
(58) Field of Classification Search .................................
375/240.01–240.07, 240.1, 240.11–240.15,
375/240.26, 240.28
See application file for complete search history.

(56) References Cited
U.S. PATENT DOCUMENTS
5,805,220 A    9/1998 Keesman et al.

| | | | | |
|---|---|---|---|---|
| 6,167,084 A * | 12/2000 | Wang et al. | ............ | 375/240.02 |
| 6,192,083 B1 * | 2/2001 | Linzer et al. | ............ | 375/240.29 |
| 6,310,915 B1 * | 10/2001 | Wells et al. | ............ | 375/240.03 |
| 6,434,197 B1 * | 8/2002 | Wang et al. | ............ | 375/240.29 |
| 6,963,608 B1 * | 11/2005 | Wu | ........ | 375/240.03 |

FOREIGN PATENT DOCUMENTS

| EP | 0881836 A1 | 4/1998 |
|---|---|---|
| WO | WO9529559 | 11/1995 |

* cited by examiner

*Primary Examiner*—David Czekaj

(57) ABSTRACT

The present invention relates to a multiplexing system comprising a set of transcoders (TC[1] to TC[n]), a controller (CONT) and a multiplexer (MUX). The set of transcoders comprises n transcoders, each transcoder (TC[i]) allowing an input compressed data signal (ICS[i]) encoded at an input bit rate (Rin[i]) to be converted into an output compressed data signal (OCS[i]) encoded at an output bit rate (Rout[i]). The controller (CONT) receives from each transcoder parametric information on the regulation process and the video coding complexity and subsequently computes the bit rate allocated (Rout[i]) to each transcoder (TC[i]) according to a total bit rate capacity available at the output of the multiplexer. The controller receives also parametric information derived from the input compressed data signal (ICS[i]), this information being used to improve the bit rate allocation strategy. Finally, the multiplexer (MUX) provides a multiplexed data signal (MS) by multiplexing of the output compressed data signals (OCS[1] to OCS[n]).

6 Claims, 2 Drawing Sheets

BIT RATE ALLOCATION IN JOINT BIT RATE TRANSCODING

FIELD OF THE INVENTION

The present invention relates to a method of controlling a set of data compression channels. The data compression channels may be, for example, transcoding channels which process MPEG encoded data signals corresponding to different programs. The transcoded programs may be multiplexed so as to form a so-called bouquet. The bouquet may be transmitted to a receiver which selects and decodes a given program from the bouquet.

BACKGROUND OF THE INVENTION

The international patent application published under number WO 95/29559 describes a multiplexing system for controlling plural channel processors. The multiplexing system is described with reference to FIG. 1 and includes:

- a multiplexer (MUX) for providing a multiplexed signal (MS),
- plural channel processors (CP[1] to CP[n]), each channel processor (CP[i]) having a control input, a data input for receiving an input signal (IS [i]), a complexity output for supplying a complexity signal representing the complexity of an associated input signal, and a data output for supplying an output data signal (OS[i]) to an associated input of the multiplexer, and
- a bit rate allocator (CONT) responsive to the complexity signals, for supplying bit rate control signals to the associated control inputs of the channel processors as a function of the complexity signals, in such a manner that a bit rate (Rout[i]) of an output data signal (OS[i]) from a channel processor (CP[i]) is a function of the complexity of an associated input data signal and of the combination of the input data signals.

In such a multiplexing system, the bit rate (Rout[i]) of an output data signal (OS[i]) from a channel processor (CP[i]) is equal to:

$$Rout[i] = \frac{X[i]}{\sum_{j=1}^{n} X[j]} Rtot$$

where i is the number of the channel processor,

X[i] is the complexity of the preceding group of pictures (hereinafter referred to as GOP) on a sliding window basis, i.e. the sum, for all the pictures of that GOP, of the product of the average quantization scale Qpic for a picture and the number of bits Tpic used to encode that picture:

$$X[i] = \sum_{GOP} Qpic \cdot Tpic,$$

Rtot is the total bit rate capacity available at the output of the multiplexer:

$$Rtot = \sum_{i=1}^{n} Rout[i].$$

SUMMARY OF THE INVENTION

It is an object of the invention to provide a method of controlling a set of transcoding channels which yields a better the bit rate allocation to the different transcoding channels and, as a consequence, a better distribution of the visual quality of the transcoded programs. The invention takes the following aspects into consideration.

The multiplexing system of the prior art proposes a method of controlling a set of encoding channels. In this method, each encoding channel (CP[i]) receives the same proportion Rout[i] of the total bit rate capacity Rtot as the coding complexity X[i] of that encoder bears to the total coding complexity of all the encoding channels.

Such a distribution of the total bandwidth among all the programs corresponding to the different input signals (IS[1] to IS[n]) is not always adequate and robust enough to allow for their complexity disparities, so that the bit rate allocation of complex programs is sometimes out of proportion compared to those of other programs. In these cases, this bit rate allocation leads to the degradation of the visual quality of lower complexity programs.

The method of controlling a set of transcoding channels in accordance with the invention comprises:

- a step of computing an indicator of a compressed data quality for the respective transcoding channels, said indicator being computed from the input compressed data signal,
- a step of allocating the output bit rate to the transcoding channel from a total output bit rate, the corresponding indicator and a sum of the indicators of the transcoding channels.

Such a method of controlling a set of transcoding channels uses an indicator which has been determined for transcoding applications in order to ensure a better distribution of the total bit rate among the different transcoding channels. Moreover, the fact that the indicator is derived from the input compressed data signal makes its value independent of a regulation step performed by the transcoder, said regulation step being intended to compute quantization scales to be applied to the input compressed data signal in order to achieve a given bit rate at the output of the transcoder. Thus, the method makes it possible to avoid drift in the bit rate allocation due to possible regulation mismatches.

The present invention further relates to a controller for controlling the bit rate allocation to a set of transcoders and also relates to a multiplexing system comprising at least two transcoders and such a controller.

These and other aspects of the invention will be apparent from and elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
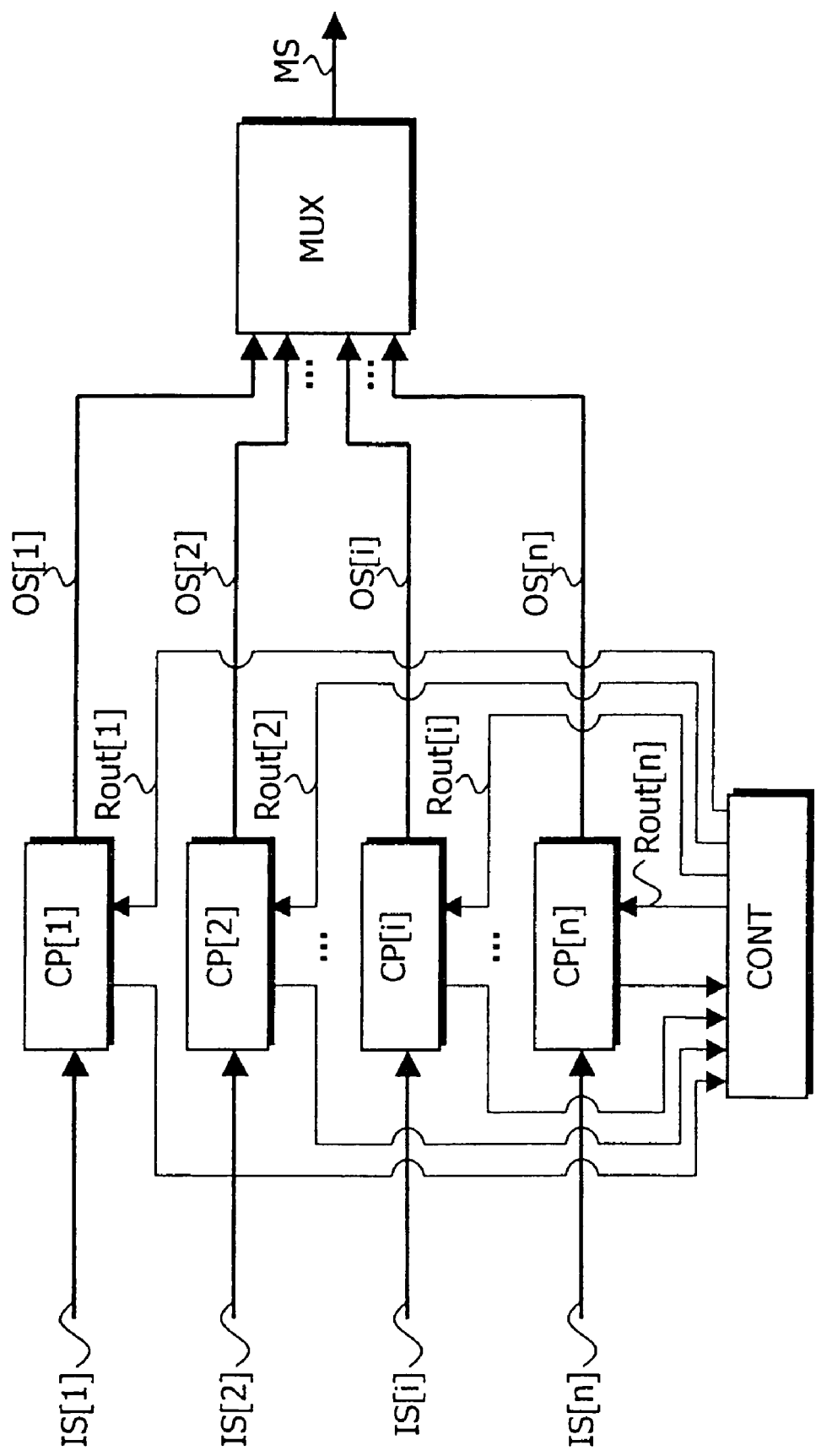
FIG. 1 is a block diagram of a multiplexing system in accordance with the prior art.
Figure 2:
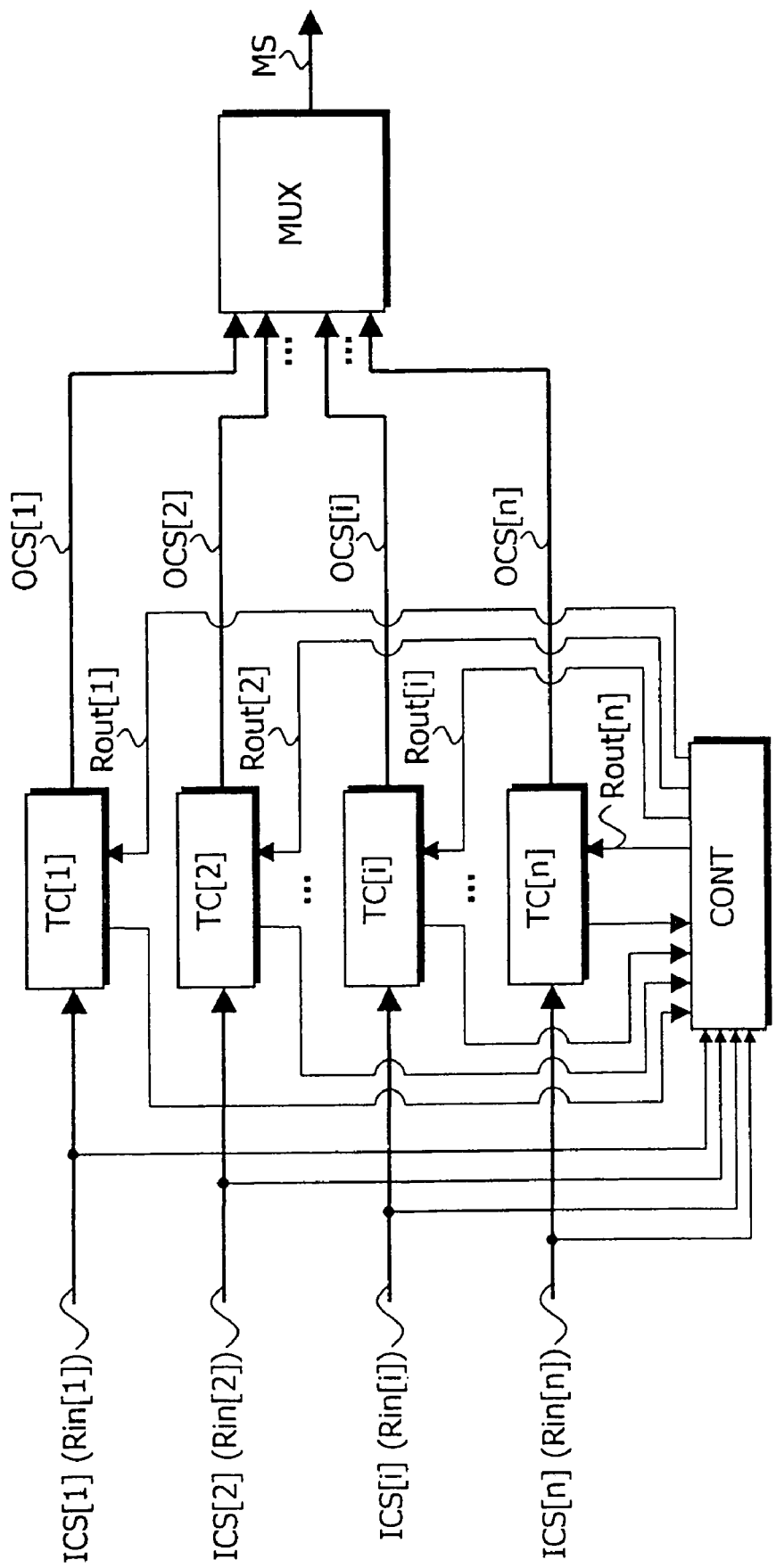
FIG. 2 is a block diagram of a multiplexing system in accordance with the invention.

The present invention relates to an improved method of controlling a set of transcoding channels. Such a method is described for MPEG-2 compressed data signals but it will be apparent to a person skilled in the art that the scope of this invention is not limited to this specific case but that the invention can also be applied to any type of compressed data signals such as, for example, those provided by MPEG-4, H-261 or H-263 standards. FIG. 2 depicts a multiplexing system in accordance with the invention. Such a multiplexing system comprises a set of transcoders (TC[1] to TC[n]), a controller (CONT) and a multiplexer (MUX).

The set of transcoders comprises n transcoders where n is an integer at least equal to two. Each transcoder (TC[i]) allows an input compressed data signal (ICS[i]) encoded at an input bit rate (Rin[i]) to be converted into an output compressed data signal (OCS[i]) encoded at an output bit rate (Rout[i]). Such a transcoder serves to reduce the bit rate of the compressed data signals (Rout[i]<Rin[i]) in order to meet the transmission constraints imposed by broadcasting applications.

When at least two MPEG-2 transcoded programs are transcoded simultaneously, it is possible to jointly control the bit rate allocated to each transcoded program in such a way that a total bit rate (Rtot), which can be fixed or variable, is shared among the transcoded programs. This technique is called joint bit rate transcoding. With such a technique, the bit rate allocation is performed in order to obtain an overall picture quality that is equally distributed among the transcoded programs in the case that each transcoder produces an MPEG-2 compliant output compressed data signal. For that purpose, the controller (CONT) receives from each transcoder parametric information on the regulation process and the video coding complexity and subsequently computes the bit rate allocated (Rout[i]) to each transcoder (TC[i]). In the present invention, the controller receives also parametric information derived from the input compressed data signal (ICS[i]), this information being used to improve the bit rate allocation strategy.

Finally, the multiplexer (MUX) provides a multiplexed data signal (MS) at the total output bit rate (Rtot) by multiplexing of the output compressed data signals (OCS[1] to OCS[n]).

The aim of joint bit rate transcoding is to equalize the picture quality over all the transcoded programs. To this end, a method of controlling a set of transcoding channels computes an indicator IND[i] of a compressed data quality corresponding to each transcoding channel (TC[i]). In the prior art, the indicator is:

$$IND_{BA}[i] = X[i],$$

where
i is the number of the transcoding channel,
X[i] is the complexity of the preceding GOP period, on a sliding window basis, calculated from the output compressed data signal (OCS[i]).

As stated hereinbefore, this indicator does not give satisfactory results. According to the Test Model 5 of the MPEG-2 standard (available under reference ISO-IEC/JTC1/SC29/WG11), pictures with a high average macro-block complexity on luminance or chrominance, i.e. areas with many details, may degrade more than others. The present invention allows for this effect by the introduction of a weighting factor wf[i] in the bit rate calculation. Moreover, in order to increase or decrease the quality of a program in comparison with the other programs, a nominal target bit rate value Rtar[i] is used for an optimal bit rate allocation. As a consequence, the indicator IND[i] corresponding to the preferred embodiment is calculated as follows:

$$IND[i] = \frac{X[i] \cdot Rtar[i]}{wf[i]}.$$

The optimum output bit rate (Rout[i]) allocated to a transcoding channel (TC[i]) is then computed as follows:

$$Rout[i] = \frac{IND[i]}{\sum_{j=1}^{n} IND[j]} \cdot Rtot.$$

As depicted in FIG. 2, the weighting factor wf[i] is derived from the input compressed data signal (ICS[i]) without decoding it. The weighting factor may be regarded as a feedback in the method of controlling a set of transcoding channels and is used to complement the complexity value X[i], the latter value being calculated from the output compressed data signal. The calculation of wf[i] is effected at a picture level that can be a Predictive coded picture or an Intra coded picture.

In a first embodiment, the weighting factor wf1[i,t] is computed, for a current encoded picture numbered t, from an average, over a set of Lmax encoded pictures preceding the current picture in the encoding order, of a function of an average quantization scale over a picture and a number of bits used to encode the same picture. Said weighting factor is equal to:

$$wf1[i, t] = \sum_{L=1}^{Lmax} (C1 + C2 \cdot Q(i, t-L) \cdot T(i, t-L))$$

where
Lmax is a predefined integer (for example equal to 2M where M is the distance between a Predictive coded picture and the next Intra or Predictive coded picture) which allows the calculation of wf1[i,t] to be smoothed temporally,
Q(i,t-L) is the average quantization scale for the picture numbered t-L,
T(i,t-L) is the number of bits used to encode the picture numbered t-L, the products of the average quantization scale Q(i,t-L) and the number of bits T(i,t-L) being homogeneous to a complexity X(i,t-L),
1 and C2 are integers used to smooth the sums of the complexity (i,t-L). A coefficient C1 equal to 8 and a coefficient C2 equal to 1 ensure a good stability of the method.

In a second embodiment, the weighting factor wf2[i,t] is computed from a weighted average of a set of (Kmax+1) averages calculated over the set of Lmax encoded pictures and is equal to:

$$wf2[i, t] = \sum_{K=0}^{Kmax} \left[ a_k \sum_{L=1}^{Lmax} (C1 + C2 \cdot Q(i, t-K-L) \cdot T(i, t-K-L)) \right]$$

where
max is a predefined integer (for example equal to M) which allows the calculation of wf2[i,t] to be smoothed temporally,
$a_K$ is a set of weighting coefficients used to define a temporal weighting window applied to the averages calculated over the set of Lmax encoded pictures. The weighting coefficients $a_K$ are for example {a0=0.6; a1=0.3;

a2=0.1} and are greater for pictures near the current picture than for distant pictures.

In this second embodiment, the first smoothing due to the averaging over the set of Lmax encoded pictures in combination with the second smoothing due to the weighted averaging provide a good stability and a good efficiency of the method of controlling a set of transcoding channels.

Thanks to the use of the weighting factor in the bit rate reallocation strategy, a better quality of the transcoded programs is obtained. Thus, no more sub-allocations of bit rate are performed on the less complex compressed data signals while the more complex ones are correctly transcoded. Allowance is made for the disparities of complexity of the input MPEG-2 programs, leading to a better distribution of the total bandwidth. Moreover, the additional calculation performed on each input compressed data signal is not only cost-effective, but also allows the input signal characteristics to be used irrespective of the regulation step of each transcoding channel. As a consequence, such a method of controlling a set of transcoding channels precludes bit rate allocation drifts in some difficult transcoding conditions.

It is possible to implement the control method using an integrated circuit which is suitably programmed. A set of instructions contained, for example, in a computer programming memory may cause the integrated circuit to carry out the different steps of the control method. The set of instructions may be loaded into the programming memory by reading a data carrier such as, for example, a disk. The set of instructions can also be made available by a service provider via a communication network such as, for example, the Internet.

Any reference sign in a claim should not be construed as limiting the claim. It is to be noted that the verb "to comprise" and its conjugations does not exclude the presence of any other steps or elements than those defined in any claim. The word "a" or "an" preceding an element or step does not exclude the presence of a plurality of said elements or steps.

The invention claimed is:

1. A method of controlling a plurality of transcoding channels, a transcoding channel allowing an input compressed data signal encoded at an input bit rate to be converted into an output compressed data signal encoded at an output bit rate wherein a regulation process uses quantization scales and the input compressed data signal to determine a video encoding complexity, said method comprising:
computing, by a multiplexing device, a weighting factor of a compressed data quality for the respective transcoding channels, the weighting factor being computed for a current picture of the input compressed data signal as an average, over a set of preceding encoded pictures, of a function of an average quantization scale over a preceding picture and a number of bits used to encode the same preceding picture;
determining, by the multiplexing device, an indicator as function of the video encoding complexity and associated weighting factor; and
allocating, by the multiplexing device, the output bit rate to the transcoding channel from a total output bit rate, its corresponding indicator and a sum of the indicators of the transcoding channels.

2. The method of claim 1, wherein the average is a weighted average of a set of the averages calculated over the set of encoded pictures.

3. A controller for controlling a set of transcoders, a transcoder allowing an input compressed data signal encoded at an input bit rate to be converted into an output compressed data signal encoded at an output bit rate wherein a regulation process uses quantization scales and the input compressed data signal to determine a video encoding complexity, said controller comprising:
a processor that is configured to:
determine a weighting factor of a compressed data quality for the respective transcoders channel, the weighting factor being computed for a current picture from the input compressed data signal as an average, over a set of preceding encoded pictures, of a function of an average quantization scale over a preceding picture and a number of bits used to encode the same preceding picture;
determine an indicator as a function of the video encoding complexity and associated weighting factor; and
allocate the output bit rate to the transcoder from a total output bit rate, its corresponding indicator and a sum of the indicators of the transcoders.

4. A data multiplexing system comprising:
a set of transcoders for converting input compressed data signals encoded at an input bit rate into output compressed data signals encoded at an output bit rate, wherein a regulation process uses quantization scales and the input compressed data signal to determine a video encoding complexity,
a controller for controlling the set of transcoders and comprising:
means for computing a weighting factor of a compressed data quality for the respective transcoders, the weighting factor being computed for a current picture of the input compressed data signal as an average, over a set of encoded pictures, of a function of an average quantization scale over a preceding picture and a number of bits used to encode the same preceding picture;
means for determining an indicator as a function of the video encoding complexity and associated weighting factor;
means for allocating the output bit rate to the transcoder from a total output bit rate, its corresponding indicator and a sum of the indicators of the transcoders, and
a multiplexer for providing a multiplexed data signal at the total output bit rate by multiplexing of the output compressed data signals.

5. A computer-readable medium that stores a computer program that, when loaded into a controller, causes the controller to:
compute a video encoding complexity using quantization scales and an input compressed data signal;
compute a factor for a current picture of the input compressed data signal as an average, over a set of encoded pictures, of an average quantization scale over a picture and a number of bits used to encode the same picture,
determine an indicator as a function of the video encoding complexity and associated weighting factor; and
allocate an output bit rate to the transcoding channel from a total output bit rate, its corresponding indicator and a sum of the indicators of the transcoding channels.

6. The computer-readable medium of claim 5, wherein the average is a weighted average of a set of the averages calculated over the set of encoded pictures.

* * * * *